(12) United States Patent
Jordison et al.

(10) Patent No.: US 7,117,984 B2
(45) Date of Patent: Oct. 10, 2006

(54) VEHICLE DIAGNOSTIC DEVICE HOUSING ASSEMBLY AND METHOD WITH CABLE WRAP AND CLAMP

(75) Inventors: Matthew Jordison, Blooming Prairie, MN (US); Manokar Chinnadurai, Owatonna, MN (US); Durval Ribeiro, Owatonna, MN (US)

(73) Assignee: SPX Corporation, Charlotte, NC (US)

( * ) Notice: Subject to any disclaimer, the term of this patent is extended or adjusted under 35 U.S.C. 154(b) by 75 days.

(21) Appl. No.: 10/892,120

(22) Filed: Jul. 16, 2004

(65) Prior Publication Data

US 2006/0011438 A1 Jan. 19, 2006

(51) Int. Cl.
*B65H 75/00* (2006.01)

(52) U.S. Cl. .................... 191/12 R; 242/400.1

(58) Field of Classification Search ............. 191/12 R, 191/12.2 R, 12.4, 12 S; 242/400, 377, 398, 242/399, 400.1, 405, 405.1; 324/378
See application file for complete search history.

(56) References Cited

U.S. PATENT DOCUMENTS

| | | | | |
|---|---|---|---|---|
| 4,392,661 A | * | 7/1983 | Langenstein | ............. 280/28.17 |
| 4,924,039 A | * | 5/1990 | McAllise et al. | ...... 191/12.2 R |
| 6,816,760 B1 | * | 11/2004 | Namaky | ..................... 701/29 |

* cited by examiner

*Primary Examiner*—Mark T. Le
(74) *Attorney, Agent, or Firm*—Baker & Hostetler LLP

(57) ABSTRACT

A method and apparatus for accommodating and retaining a communications cable of a vehicle diagnostic recorder device is provided. The apparatus is designed to house internal components of the vehicle diagnostic recorder device which communicate with an onboard control computer of a vehicle comprising. The apparatus may include an access hole for receiving a communications cable from an interior of the apparatus into a recessed cable channel which leads to a recessed channel portion. The communications cable may be further wrapped along an outer periphery of the recessed channel portion and retained via a clamp mechanism along an exterior thereof.

20 Claims, 3 Drawing Sheets

US 7,117,984 B2

VEHICLE DIAGNOSTIC DEVICE HOUSING ASSEMBLY AND METHOD WITH CABLE WRAP AND CLAMP

FIELD OF THE INVENTION

The present invention relates generally to a housing assembly for electronic test equipment. More particularly, the present invention relates to a housing assembly and method for accommodating and retaining a cable wrap assembly of a vehicle diagnostic recorder device.

BACKGROUND OF THE INVENTION

Vehicle repair stations generally diagnose and attempt to repair a variety of problems which may occur in motor vehicles such as automobiles. Often, a service technician may attempt to diagnose a simple, complex, or even repetitive problem occurring in a vehicle. Many times, problems are realized using a variety of diagnostic equipment, located on site for example, or such problems can be replicated and addressed using proper diagnostic and/or repair equipment. However, for intermittent problems, it may be more difficult for a service technician to discover the problem(s) even by using diagnostic equipment. This may be, because the service technician is unable to replicate the problem(s) while the vehicle is at the vehicle repair station for a variety of reasons.

For example, some vehicular problems may only occur during certain instances and/or under specific phenomenon(s). By way of example, such incidents may include driving the vehicle at a certain speed over a period of time, accelerating at a particular RPM value or range of RPM values, driving the vehicle in a particular direction or even perhaps under certain directional forces, etc. Such intermittent problems occurring under particular circumstances may be difficult to emulate while a vehicle is actually at a repair facility. Additionally, due to a volume of vehicles needing to be serviced, a service technician may not be able to spend a large amount of time which may be required to replicate the problem.

Hence, it may be possible that the problem is not addressed properly. This may be especially true for problems that only occur intermittently or for problems that simply may not be replicated on site at a service facility. If a service technician can not diagnose the problem(s) while the vehicle is in the service station, then the owner/operator may have to return the vehicle when the problem occurs again. It may not always be feasible for the vehicle owner/operator to return in a timely fashion. Additionally, this process can prove to be inconvenient, troublesome, and/or time consuming for the vehicle owner/operator. Thus, a source of frustration may occur for the vehicle owner/operator attempting to resolve intermittent problems or problems which cannot be replicated while at a repair site facility.

Attempts have been made to address such problems using, for example, diagnostic tools utilized within the prior art. One common method, has included utilizing diagnostic equipment to gather vehicle data and to subsequently analyze the data in an attempt to pinpoint occurring, reoccurring, and/or potential problems in vehicles. This may be done, for example by coupling the diagnostic equipment into an onboard control computer of a vehicle to collect the data.

Onboard control computers have become ubiquitous in motor vehicles, as safety, economy, and emissions requirements have continued to escalate, and conventional designs for reciprocating engines, friction braking systems, collision safety apparatus, and traction control devices have proven unequal to the requirements set out in law and the implicit demands of competitors' achievements. Successive generations of onboard control computers have acquired increasing data sensing and retention capability as the electronic art has advanced. Present external diagnostic and display apparatus, known to those skilled in the art as scan tools, have been connected to the onboard control computers in order to gather vehicle data. Such scan tools may provide complex analysis of the data collected in order to diagnose problems in a vehicle.

Because of the complexity of the aforementioned scan tools, service technicians are generally called upon to not only provide proper connection of the scan tool but to also operate them accordingly. This may include receiving and processing information collected by the scan tool. In operation, scan tools are typically connected to the onboard control computer of a vehicle via wire/cable connection. However, utilizing such scan tools by skilled technicians may only address vehicle problems detected while the vehicle is located at the vehicle repair site facility. For intermittent problems, or those problems which cannot be detected at the repair facility, the owner/operator would generally not have access to such sophisticated equipment, such as the scan tool, to diagnose an incurring problem. Additionally, since most scan tools require connection and operation by a skilled technician, most novice vehicle owners/operators would not be capable of operating the scan tool to diagnose incurring vehicle problems. Furthermore, while a technician could feasibly leave a scan tool connected to the vehicle onboard control computer, the connected hard wire(s)/cable(s) could impose difficulty to the owner/operator of the vehicle during operation of the vehicle. Thus, the prior art lacks the wherewithal and finesse to provide a novice vehicle owner/operator with a convenient and practical means to allow an owner/operator to collect vehicle data away from a vehicle service site facility.

Accordingly, it is desirable to provide a method and apparatus for collecting diagnostic information at the point when a problem occurs in a vehicle—the diagnostic informational data to be subsequently analyzed by a service technician. It is further desirable to provide a method and apparatus which allows a novice vehicular owner/operator to collect the vehicular diagnostic information for subsequent analysis by a skilled technician for example. Additionally, it is further desirable to provide a method and apparatus which collects vehicular diagnostic information in a convenient manner conducive, for example, to a compact and suitable design for integrating with the onboard diagnostic computer of the vehicle.

SUMMARY OF THE INVENTION

The foregoing needs are met, to a great extent, by the present invention, wherein in one aspect a method and apparatus are provided that in some embodiments accommodates and further retains a communications cable of a vehicle diagnostic recorder device in an orderly, convenient, and generally aesthetically pleasing fashion.

In accordance with one aspect of the present invention, a housing assembly is provided that, in some embodiments, includes an upper lip portion, a lower lip portion and a recessed channel portion. A recessed cable channel may be located in the recessed channel portion. The housing assembly may also include an access hole for receiving a communications cable from an interior of the housing assembly into the recessed cable channel and a clamp mechanism for retaining a portion of the communications cable on the housing.

In accordance with another aspect of the present invention, a method of accommodating a communications cable of a vehicle diagnostic recorder device is provided that, in some embodiments, includes providing a housing assembly comprising a recessed channel portion, a recessed cable channel located in the recessed channel portion, and an access hole for receiving a communications cable from an interior of the housing assembly. The method may further include feeding a length of communications cable from within the interior of the housing assembly through the access hold into the recessed cable channel.

In accordance with yet another aspect of the present invention, a system for accommodating and retaining a communications cable provided, that, in some embodiments, includes a means for housing components of a vehicle diagnostic cable, a means for channeling cable, a means for accessing a length of communications cable from an interior of the housing means into the channeling means, and a means for retaining a portion of communications cable on the housing.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
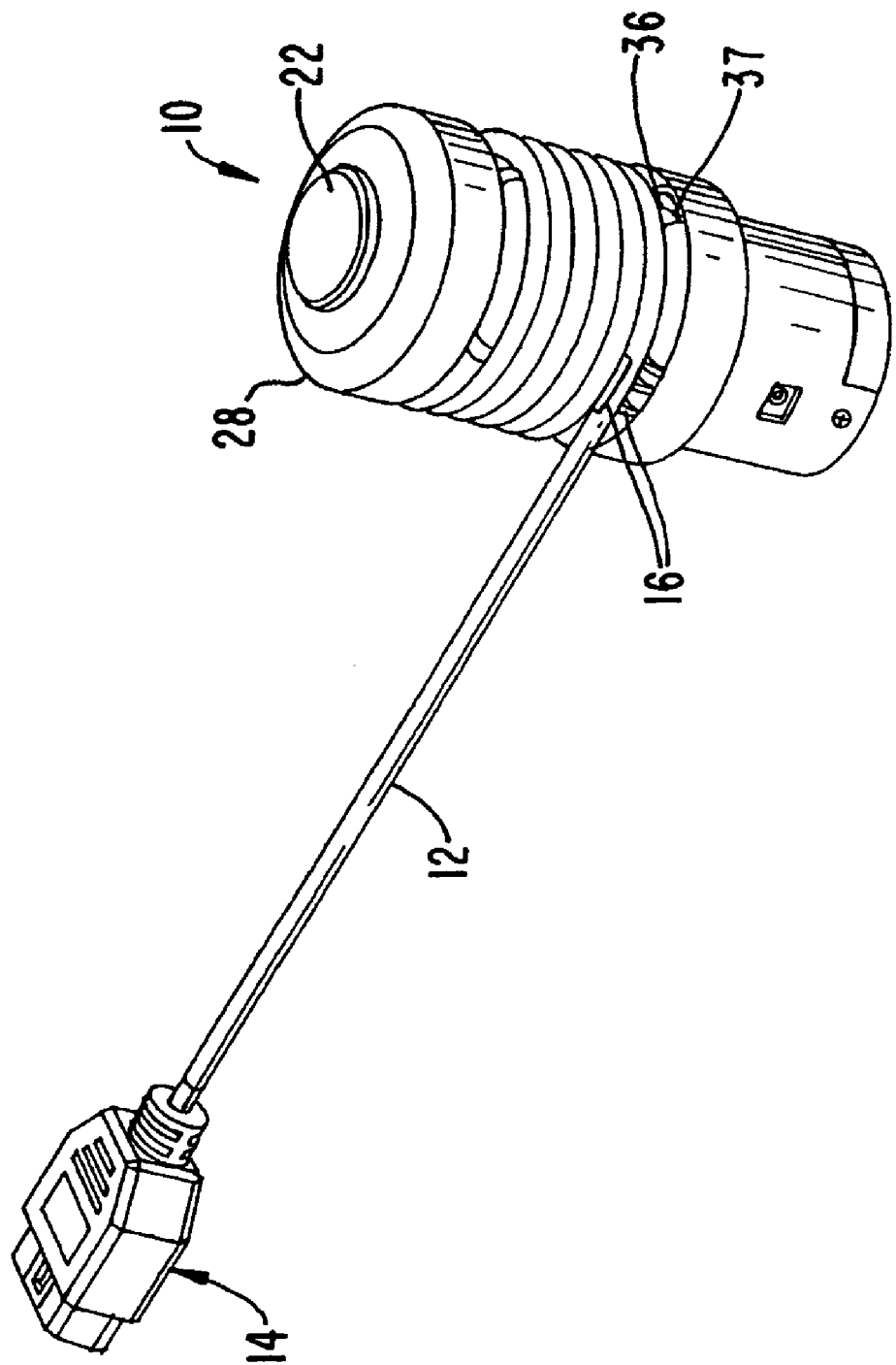
FIG. 1 is a perspective view illustrating a vehicle diagnostic recorder device according to a preferred embodiment of the invention.

An embodiment in accordance with the present invention provides a method and apparatus for collection of vehicular diagnostic information in a convenient manner, conducive, for example, to a compact and suitable design for integrating with the onboard diagnostic computer of a vehicle. The invention provides an improved cable-wrap design to accommodate wired connection of the apparatus to a vehicle onboard control computer. Such design may provide a convenient apparatus accessible to an owner/operator for collecting vehicular diagnostic information in a safe and efficient manner. Furthermore, the cable-wrap design of the present invention provides an aesthetically pleasing arrangement marrying any desirable excess of wire from the apparatus to the onboard control computer. Preferred embodiments of the invention will now be described with reference to the drawing figures, in which like reference numerals refer to like parts throughout.

An embodiment of the present inventive apparatus is illustrated in FIG. 1. A vehicle diagnostic recorder device 10 is shown having a length of communications cable 12 wrapped around a periphery thereof. The vehicle diagnostic recorder device 10 contains a hardware platform for serving as a vehicle data recorder system. The vehicle diagnostic recorder device 10 may be programmed to record vehicle data stream information when a trigger button 22 is activated. This information may be subsequently uploaded to a host workstation, for example, for later analysis. The vehicle diagnostic recorder device 10 is ultimately designed to support a variety of communication protocols including, for instance, GMLAN, J-1850, Key Word 2000, ISO-9141, UART, and Kelsey-Hayes.

In order for the vehicle diagnostic recorder device 10 to communicate with the onboard control computer of a vehicle, a communications cable 12 is provided for connection thereto. An end of the communications cable 12 terminates in a connection end 14 which is further capable of connecting to an onboard control computer of a vehicle. In a preferred embodiment, the communications cable 12 comprises an integrated vehicle I/O cable having a connection end 14 such as a J1962 male connector located at one end thereof. The communications cable 12 is further connected to internal components of the vehicle diagnostic recorder device 10 at another end. Thus, the vehicle diagnostic recorder device 10 is connectable to an onboard control computer of a vehicle via the communications cable 12.

A primary purpose of the vehicle diagnostic recorder device 10 includes connecting and communicating to an onboard control computer of a vehicle in order to allow an owner/operator to record a sample of diagnostic data stream from the vehicle when a problem occurs. A design of the vehicle diagnostic recorder device 10 includes a trigger button 22 which can be depressed by an owner/operator when a problem is determined. When the trigger button 22 is activated, the vehicle diagnostic recorder device 10 will sample and store a vehicle data stream from the onboard control computer for subsequent analysis. Recordation of sampled vehicle data in the prescribed manner may facilitate tracing and treating a problem occurring with the vehicle since the data is being recorded at the time the problem occurs.

Thus, it may be important to locate the vehicle diagnostic recorder device 10 in a location convenient to the owner/operator in order to allow easy access to the trigger button. In so doing, it may also be important to ensure that the vehicle diagnostic recorder device 10 does not interfere with the owner/operator's ability to operate the vehicle including, for example, maneuvering around or avoiding any dangling wire connections from the vehicle diagnostic recorder device 10 to the onboard control computer.

It is also known that the placement of the onboard control computer connection may vary from makes and models of different vehicles. Accordingly, the vehicle diagnostic recorder device 10 is designed to accommodate varied locations of onboard control computer connectors by providing a communications cable 12 as shown in FIG. 1. The communications cable 12 can accommodate various locations of the onboard control computer connection point. This is accomplished, in part, by designing the communications cable 12 to be generally eight feet in length. This amount of length has been determined to allow the vehicle diagnostic recorder device 10 to be within reach of an owner/operation of the vehicle while also accommodating connection to various locations of the onboard control computer connector for various makes and models of vehicles.

It will become apparent, that for different makes and models of vehicles, a different prescribed length of communications cable 12 may be needed in order to connect the vehicle diagnostic recorder device 10 to an onboard control computer for a particular vehicle. Thus, for one vehicle make and model, one length of communications cable 12 may be utilized. For another vehicle make and model, another length of communications cable 12 may be required. Hence, an excess length of communications cable 12 may not be utilized. In order to provide a relatively quick and tidy arrangement of securing any excess wire, an embodiment of the present invention provides a design to allow a desired length of the communications cable 12 to be wrapped around and stored upon the vehicle diagnostic recorder device 10. The communications cable 12 may further be secured to an outside periphery of the vehicle diagnostic recorder device 10.

In a preferred embodiment, the wrapped communications cable 12 is secured thereto via clamp mechanism 16. The clamp mechanism 16 comprises an upper lip portion 42 and a plurality of lower tab portions 44 as shown, for instance, in FIG. 2. The upper lip portion 42 comprises a cantilevered resilient shelf that extends outwardly. The plurality of lower tab portions 44 comprise parallel ridges extending radially outwardly and upwardly. Both the upper lip portion 42 and the lower tab portions 44 are preferably dimensioned to be the same as an outer diameter of the communications cable 12 in order to frictionally engage the communications cable 12 accordingly. A channel space 46 defined between the upper lip portion 42 and the plurality of lower tap portions 44 is designed to generally accommodate a width of the communications cable 12 when placed therein.

The communications cable 12 is preferably retained along an outside periphery of the vehicle diagnostic recorder device 10 between the upper lip portion 42 and the plurality of lower tap portions 44 by frictional engagement. The vehicle diagnostic recorder device 10 may further contain two clamp mechanisms 16 on opposite sides of its outer periphery. Wrapping excess communications cable 12 in the prescribed manner can provide a neat and orderly retention of any excess communications cable 12 length and further reduce potential interference of the communications cable with either the owner/operator of the vehicle or another component.

In a preferred embodiment, the wrapped portion of communications cable 12 is received and accommodated within a recessed channel portion 18 of the vehicle diagnostic recorder device 10. The recessed channel portion 18 is preferably accommodated by an exterior surface portion 20 of the vehicle diagnostic recorder device 10 as shown in FIGS. 2 and 3.

Figure 2:
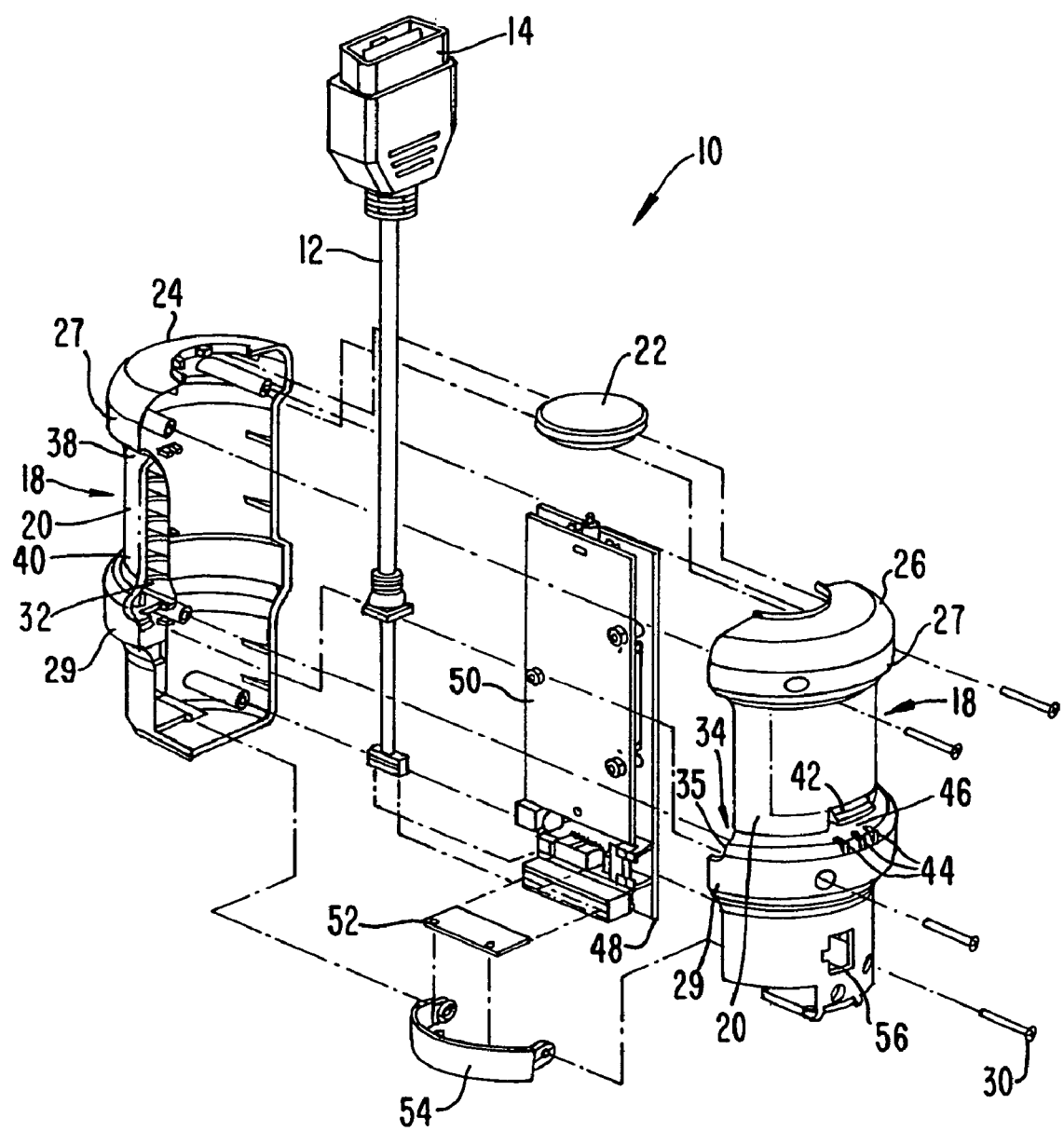
FIG. 2 is an exploded view of the vehicle diagnostic recorder device shown in FIG. 1.

FIG. 2 illustrates an exploded view of the vehicle diagnostic recorder device 10. An outer housing cover 28 generally retains all the components of the vehicle diagnostic recorder device 10. Such components may include circuitry and electronic components for communicating with the onboard control computer of a vehicle being diagnosed. In the embodiment shown, a vehicle interface board 48 is shown in communication with processor board 50. The vehicle interface board 48 may be further coupled to an end of the communications cable 12 in order to communicate with the onboard control computer. An additional circuit board 53 may also be provided, for instance, to communicate with vehicle interface board 48 and processor board 50. A function of the additional circuit board 53 may include providing additional or updated information to the vehicle diagnostic recorder device 10 via the vehicle interface board 48. As an example, such updated information may be software related or include updated vehicle specifications. A quick access cover 54 may be incorporated into the outer housing cover 28, for example, to cover and protect the additional circuit board 53. Additionally, access holes, such as one accommodating an RJ-45 connector, may also be provided in the outer housing cover 28 to allow access to internal components, including, for example, those located on the vehicle interface board 48.

In the embodiment shown in FIG. 2, the outer housing cover 28 comprises a first half 24 and a second half 26 wherein the two halves form a complimentary uniform outer housing cover 28 when mated together. The complimentary halves 24, 26 may be further retained by fasteners 30. In a preferred embodiment, each half 24, 26 contains an upper lip portion 27 and a lower lip portion 29. Each half 24, 26 further contains a recessed channel portion 18 accommodated along an exterior surface portion 20. The recessed channel portion 18 of each half 24, 26 is further defined between the upper lip portion 27 and the lower lip portion 29. When mated together, the first half 24 and the second half 26 form a single recessed channel portion 18 along a circumference of the vehicle diagnostic recorder device 10. The recessed channel portion 18 is designed to receive a wrapped portion of the communications cable 12.

Figure 3:
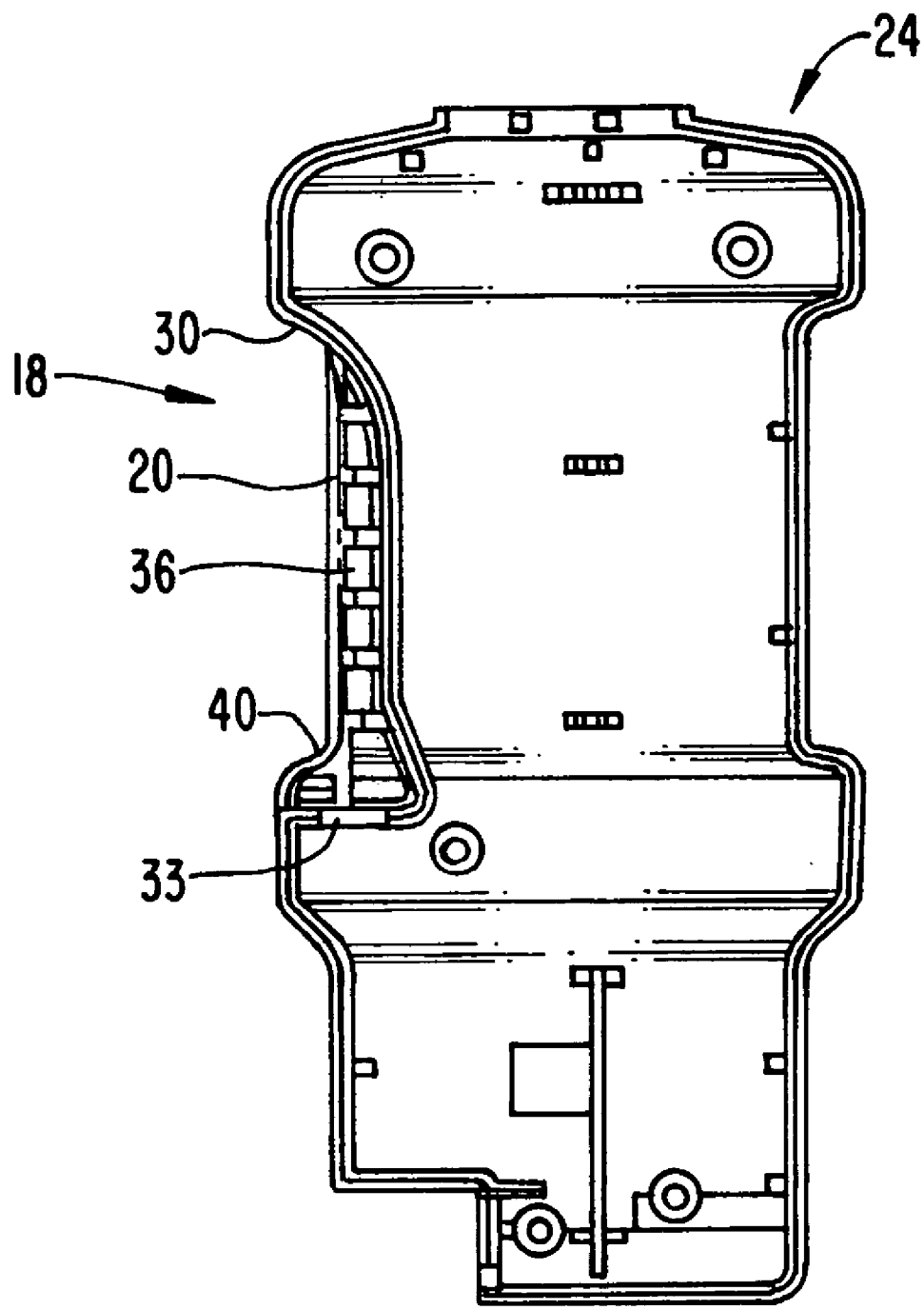
FIG. 3 is an internal side view illustrating one half of an enclosure for the vehicle diagnostic recorder device.

The first half 24 and the second half 26 may also contain a first cable recess groove 32 and a second cable recess groove 34 as depicted in FIGS. 2 and 3. When the first half 24 and the second half 26 are mated together, the first cable recess groove 32 and the second cable recess groove 34 are aligned to form a single recessed cable channel 36.

A first access hole cutout 33 and a second access hole cutout 35 may also be formed in the first half 24 and the second half 26, respectively. When the first half 24 and the second half 26 are mated together, the first access hole cutout 33 and a second access hole cutout 35 are aligned to form a single main access hole 37. The access hole 37 can accommodate a length of the communications cable 12 protruding from an interior of the uniform outer housing cover 28 into the recessed cable channel 36. Hence, a length of the communications cable 12 may be guided from within the uniform housing cover 28, through the access hole 37, into the recessed cable channel 36 and further along an exterior of the uniform housing cover 28.

The communications cable 12 may be further wrapped along the recessed channel portion 18 generally beginning at a top portion 38 and wrapped downwardly towards a bottom portion 40. Any remaining communications cable 12 reaching the bottom portion 40 may be feed through the channel space 46 defined between the upper lip portion 42 and the plurality of lower tap portions 44. Thus the cable-wrap design, as described herein, may accommodate and further retain excess communications cable 12 of the vehicle diagnostic recorder device 10 in an orderly and generally aesthetically pleasing fashion while attempting to gather vehicle diagnostic information using diagnostic equipment.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A housing assembly for accommodating and retaining a communications cable of a vehicle diagnostic recorder device and further retaining components of the vehicle diagnostic recorder device which communicate with an onboard control computer of a vehicle comprising:
    an upper lip portion;
    a lower lip portion;
    a recessed channel portion having a length, a top portion and a bottom portion wherein the recessed channel portion is located on an exterior surface of the housing assembly and defined between the upper lip portion and the lower lip portion, wherein the recessed channel portion accommodates a length of communications cable connected to one of the components;
    an access hole for receiving the communications cable from an interior of the housing assembly;
    a recessed cable channel located in and perpendicular to the length of the recessed channel portion such that the communication cable extents from the access hole and rest in the recessed cable channel to reach the top portion of the recessed channel portion; and
    a clamp mechanism generally located at the bottom portion of the recessed channel portion for retaining a portion of the communications cable on the housing.

2. The assembly of claim 1, wherein the housing assembly further comprises:
    a first half; and
    a second half wherein the first half and the second half are mated together to form a uniform housing cover.

3. The assembly of claim 2, further comprising:
    fasteners for retaining the first half and the second half together.

4. The assembly of claim 1, wherein the clamp mechanism further comprises:
    an upper lip portion;
    a plurality of lower tab portions; and
    a channel space defined between the upper lip portion and the plurality of lower tab portions for receiving and retaining communications cable.

5. The assembly of claim 4, wherein the channel space generally accommodates a width of the communications cable when the cable is placed therein.

6. The assembly of claim 1, wherein a length of communications cable is wrapped around a circumference of the recessed channel portion.

7. The assembly of claim 1, wherein a length of the communications cable is fed from an interior of the housing assembly through the access hole into the recessed cable channel and generally wrapped around a circumference of the recessed channel portion and further retained by the clamp mechanism.

8. The assembly of claim 7, wherein the communications cable is generally wrapped from the top portion in a direction towards the bottom portion.

9. A method of accommodating a communications cable of a vehicle diagnostic recorder device comprising:
    providing a housing assembly comprising a recessed channel portion having a length and located on an exterior surface of the housing assembly wherein the recessed channel portion further comprises a top portion and a bottom portion, the housing assembly further comprising a recessed cable channel located in and perpendicular to the recessed channel portion and an access hole for receiving the communications cable from an interior of the housing assembly; and
    feeding a length of the communications cable from within the interior of the housing assembly through the access hole into the recessed cable channel.

10. The method of claim 9, further comprising:
    feeding a length of the communications cable from the recessed cable channel into the recessed channel portion.

11. The method of claim 10, further comprising:
    wrapping a length of communications cable around a periphery of the recessed channel portion.

12. The method of claim 11, further comprising:
    generally wrapping a length of communications cable from the top portion towards the bottom portion.

13. The method of claim 11, further comprising:
    clamping a portion of the communications cable to retain it along the exterior surface.

14. The method of claim 12, further comprising:
    clamping a portion of the communications cable generally at the bottom portion to retain it along the exterior surface.

15. A system for accommodating and retaining a communications cable of a vehicle diagnostic recorder device comprising:
    means for housing components of a vehicle diagnostic recorder device;
    means for receiving a length of communications cable, said receiving means having a length and located on an exterior surface of the housing means;
    means for accessing the communications cable from an interior of the housing means;
    means for channeling cable, located in and perpendicular to the length of the receiving means such that the communication cable extents from the accessing means and rest in the channeling means; and
    means for retaining a portion of communications cable on the housing.

16. The system of claim 15, wherein the receiving means comprises:
    a recessed channel portion.

17. The system of claim 16, wherein the housing means comprises:
    an upper lip portion; and
    a lower lip portion wherein the recessed channel portion is defined between the upper lip portion and the lower lip portion.

18. The system of claim 16, wherein the channeling means comprises:
    a recessed cable channel located in the recessed channel portion.

19. The system of claim 18, wherein the accessing means comprises:
    an access hole for receiving a length of communications cable from an interior of the housing means into the recessed cable channel.

20. The system of claim 15, wherein the retaining means comprises:
    a clamp mechanism.

* * * * *